United States Patent
Foladare et al.

[11] Patent Number: 5,946,626
[45] Date of Patent: Aug. 31, 1999

[54] METHOD AND SYSTEM FOR DETERMINING LOCATION OF SUBSCRIBER OF TWO-WAY PAGING SERVICE

[75] Inventors: Mark Jeffrey Foladare, Kendall Park; Shelley B. Goldman, East Brunswick; David Phillip Silverman, Somerville; Roy P. Weber, Bridgewater, all of N.J.

[73] Assignee: AT&T Corp., Middletown, N.J.

[21] Appl. No.: 08/581,710

[22] Filed: Dec. 26, 1995

[51] Int. Cl.[6] .................... H04Q 7/08; H04Q 7/20
[52] U.S. Cl. .............. 455/456; 455/31.3; 455/461; 455/412; 455/458
[58] Field of Search ................... 455/31.3, 31.2, 455/412, 427, 428, 430, 403, 456, 413, 414, 458, 461; 340/825.44, 825.49; 342/457

[56] References Cited

U.S. PATENT DOCUMENTS

| | | | |
|---|---|---|---|
| 3,976,995 | 8/1976 | Sebestyen | 455/31.3 |
| 4,752,951 | 6/1988 | Konneker | 340/825.44 |
| 5,032,845 | 7/1991 | Velasco | 342/457 |
| 5,051,741 | 9/1991 | Wesby | 340/825.49 |
| 5,327,486 | 7/1994 | Wolff et al. | 455/31.3 |
| 5,479,408 | 12/1995 | Will | 455/456 |
| 5,485,163 | 1/1996 | Singer et al. | 455/456 |
| 5,506,886 | 4/1996 | Main et al. | 455/31.3 |
| 5,515,426 | 5/1996 | Yacenda et al. | 455/456 |
| 5,625,668 | 4/1997 | Loomis et al. | 455/31.3 |
| 5,682,142 | 10/1997 | Loosemore et al. | 340/825.44 |

*Primary Examiner*—Wellington Chin
*Assistant Examiner*—Keith Ferguson

[57] ABSTRACT

A method and system for determining the location of a subscriber of a two-way paging service includes a telephone network with a switched network and a paging service operatively connected thereto. The paging service includes a paging receiver for receiving a location parameter from a two-way pager of a subscriber of a paging network. The switched network includes a unit for generating a location message to a caller when the caller queries the network for the subscriber location.

18 Claims, 4 Drawing Sheets

METHOD AND SYSTEM FOR DETERMINING LOCATION OF SUBSCRIBER OF TWO-WAY PAGING SERVICE

FIELD OF THE INVENTION

This invention relates to a method and system for determining the location of a subscriber of a two-way paging service.

BACKGROUND OF THE INVENTION

Two-way paging is an emerging technology that is advantageous because a mobile party can be more readily located to establish communications. The network link to a two-way paging network allows dependent-location calling and other services.

It would be advantageous if the two-way paging network could be used also for locating a subscriber without establishing two-way communication. For example, at times a caller may desire the whereabouts of the subscriber, without establishing two-way communication. For example, a wife, employer, probation officer or other individual may want to know the location of a spouse, employee, parolee or friend. There would be no need for connecting the call to the subscriber. The only need would be determining the subscriber location.

SUMMARY OF THE INVENTION

In accordance with the present invention, the location of a subscriber to a two-way paging service can now be determined without establishing two-way communication. In one aspect of the invention, a signal is transmitted from a two-way pager carried by a subscriber to a paging service of a telephone network. The signal includes a location parameter. The location parameter is forwarded to a network switch. After the caller queries the network for the subscriber location, the network generates a location message. This location message could be a text-to-speech recording that is derived from the location parameter.

In one aspect of the present invention, an announcement is supplied to the caller indicating the location of the subscriber. In still another aspect of the invention, a personal identification number can be requested from the caller before supplying a location message. An announcement can also be supplied requesting the caller to state their name and querying a database to determine if the caller has clearance to receive location information. In another aspect of the present invention, the call can be connected to a voice response unit. One or more digits are collected and the digits passed to a network control point. The digits are used to determine whether a location message should be routed to the caller entering the digits.

BRIEF DESCRIPTION OF THE DRAWINGS

The foregoing features and advantages of the present invention can be appreciated more fully from the following description, with references to the accompanying drawings in which.

DETAILED DESCRIPTION

Figure 1:
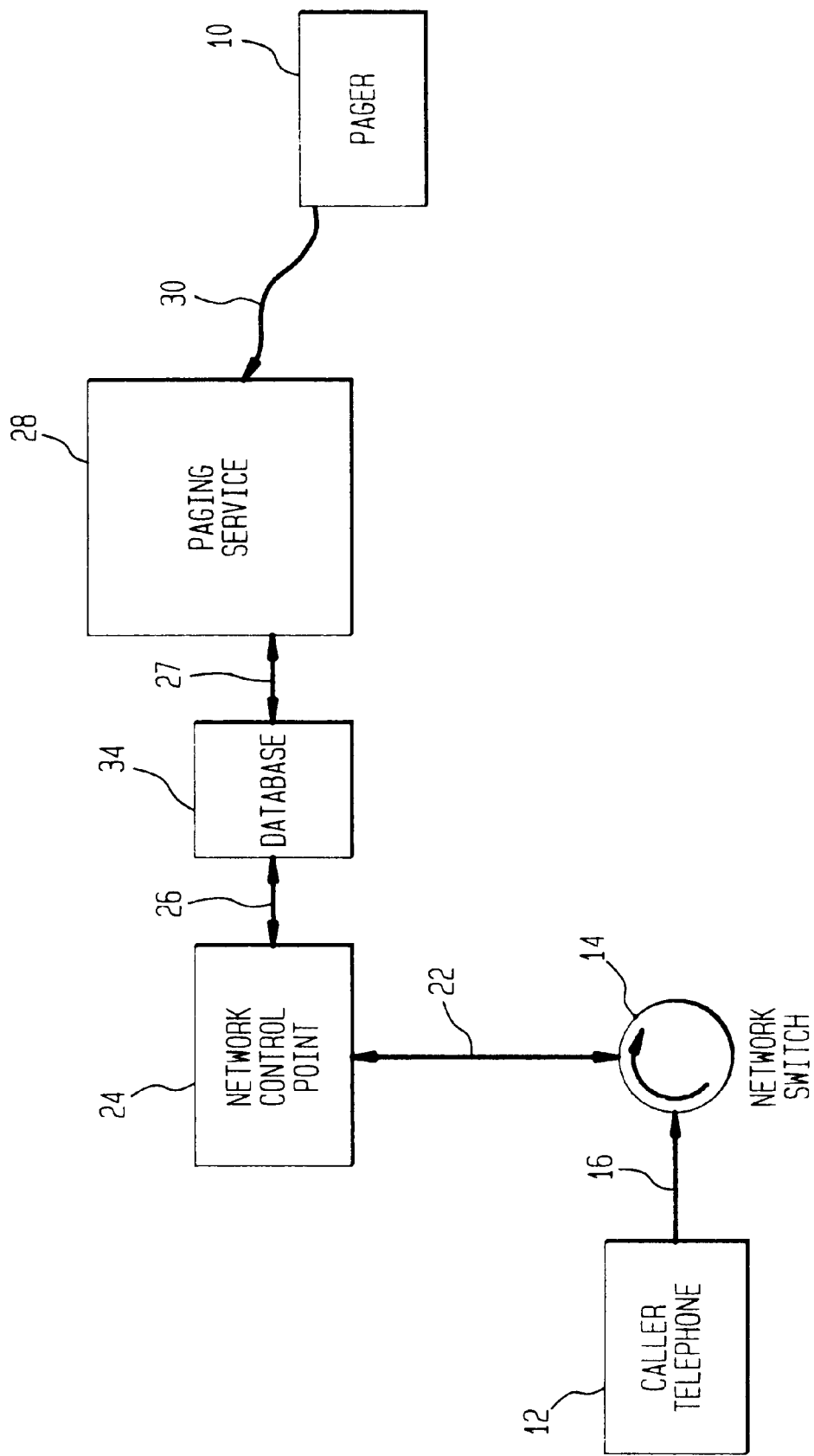
FIG. 1 is a block-schematic diagram of the method and system for determining the location of a subscriber of a two-way paging service in accordance with the present invention.

Referring to FIG. 1, there is shown a block diagram of a communication system incorporating the present invention that allows a caller to locate a subscriber of a two-way paging service. The caller initiates the call via a caller telephone 12. The caller telephone, like other telephones hereinafter discussed, is used merely as an illustration. The invention may be implemented using a variety of communication devices, including, but not limited to telephones, computers, and facsimile machines.

The caller telephone 12 is connected to a network access switch 14 by a first communication coupling 16 which may take the form of a telephone line, twisted pair line, coaxial cable, fiber optic line, wireless link, or any other type of communication coupling. Other communication couplings described hereafter could be a telephone line, twisted pair line, coaxial cable, fiber optic line, wireless link or other similar communication coupling.

A second communication coupling 22 connects the network access switch 14 to a Network Control Point (NCP) 24 that is coupled to a database 34 via a third communication coupling 26. The database is coupled to a paging service 28 via a fourth communication coupling 27. The mobile party uses the pager to transmit a location signal, represented by wireless link 30, to the paging service. The location signal includes location parameters that are associated with the location of the two-way paging subscriber, such as a call-site number. The location signal may also include other identifying information, which can be used by the paging service to identify the transmitting pager.

Upon receiving the location signal from the pager, the paging service relays the signal to the database where the location parameter is extracted from the signal and stored. The location parameter supplied by the mobile party is cross-referenced with the party's personal telephone number (PTN) so that whenever the party's PTN is dialed the actual location for that party may be retrieved from the database, and supplied as a voice response by means such as a Voice Response Unit (VRU). Additionally, the system can be designed so that only certain callers have the option of accessing the database.

When a caller initiates a call by dialing the mobile party's PTN, the call is coupled to network access switch 14 via first communication coupling 16. The network access switch 14 then queries the NCP for instructions via second communication coupling 22, and the NCP, in turn, queries the database through third communication coupling 26. Based on the dialed PTN, the database retrieves the mobile party's location parameter and passes it back to the NCP via the third communication coupling. The NCP, in turn, passes this information to the network access switch 14 which can then have a Voice Response Unit supply an announcement.

In another aspect of the present invention, it will be apparent to those skilled in the art that the database 34 may be incorporated into the NCP 24 or paging service 28. The invention could then be implemented without a separate database element.

Figure 2:
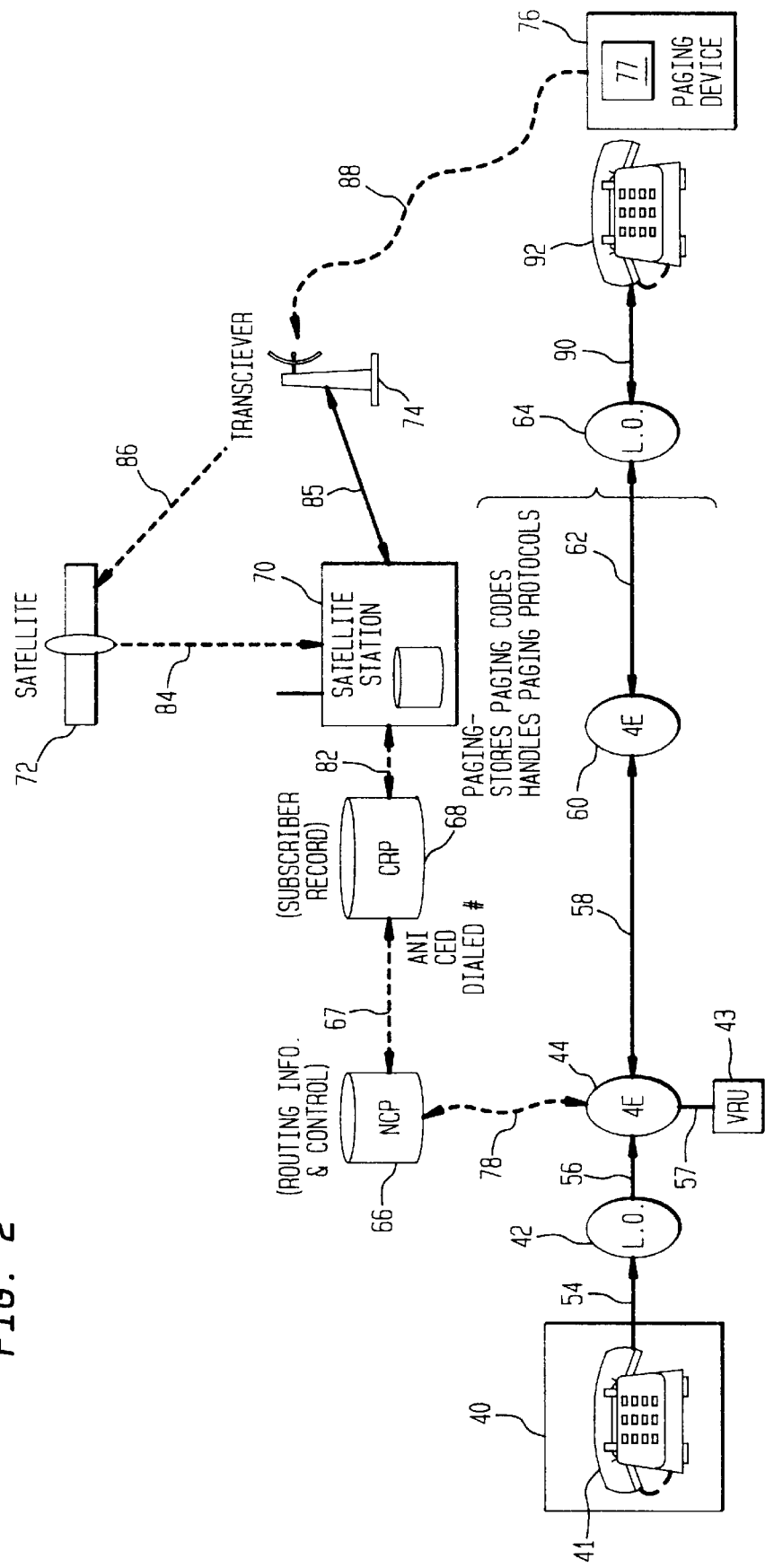
FIG. 2 is a block-schematic diagram of one aspect of the system of the present invention.

In one aspect of the invention, as shown in FIG. 2, the present invention is incorporated into an existing telephone network. As shown in the figure, a caller 40 seeks the location of a mobile party, or "subscriber", 76 who is assigned a Personal Telephone Number (PTN) and is equipped with a two-way pager 77. The caller initiates an incoming call from a telephone 41 by dialing the subscriber's PTN. This incoming call is coupled to a first local office 42 in the caller's locality through a first telephone line 54. The first local office routes the call to an originating access switch 44 over a first trunk line 56. Switch 44 may take the form of a digital switch, or an electronic switching system, such as an AT&T 4ESS™ switch ("4E" switch) commonly known to those skilled in the art.

Once the call has been routed, the switch 44 queries a Network Control Point (NCP) 66 via a first Common Channel Interoffice Signaling (CCIS) link 78. (Common Channel Interoffice Signaling) refers to the transmission of call control signaling between telephone offices, wherein a plurality of call control channels are multiplexed onto a single data link. At this point, if the subscriber has provisioned for the collection of Customer Entered Digits (CED) the NCP instructs the switch 44 to couple the call to a Voice Response Unit (VRU) 43 via a first communication link 57. The VRU (e.g. an AT&T Network Services Complex, or NSCX) then plays a standard prompting announcement to the caller and collects the CED (e.g. a Personal Identification Number, or PIN) via the reception of up to ten Dual Tone Multi Frequency (DTMF) digits (i.e. Touch Tone™ signals from a Touch Tone™ telephone). In a system using a CED, provision must be made for the case where a caller can not enter digits because the caller is at a rotary dial station or does not respond to the prompt. In these two situations, the VRU may allow for a time-out or an abbreviated dialing sequence (e.g., #) to denote that no digits are forthcoming. Any CED collected by the VRU is passed back to the NCP.

After the collection of CED, or immediately after the originating access switch queries the NCP, the NCP queries a Customer Routing Point (CRP) 68 via a second CCIS link 67. In the query, the NCP sends the CED, the PTN, and the caller telephone number (Automatic Number Identification number, or "ANI"). Based on the ANI and/or CED, the CRP screens the call, deciding whether or not the caller is to receive the subscriber location information. If the caller is not to receive subscriber information, the CRP instructs the NCP to route the call to a switch where an announcement could be played. If the caller is to receive location information, the CRP accesses a subscriber record stored within the CRP, retrieves the location parameter for the subscriber from the record, and returns the parameter to the NCP via CCIS link 67. The NCP relays the location parameter to the originating access switch via CCIS link 78 where the parameter could be subject to a text-to-voice translation.

The subscriber may update the location parameter at any time using the two-way pager. The update can be done automatically or voluntarily. The subscriber 76 could generate a location signal containing the new location parameter using the two-way pager 77. The location signal is transmitted to a paging service transceiver 74. The transceiver relays the signal to a satellite ground station 70, either directly, via communication coupling 85, or indirectly, via wireless link 86, satellite 72, and wireless link 84 via wireless link 86. The satellite ground station, in turn, passes the signal to the CRP via a second communication link 82. The CRP extracts the new location parameter and uses it to update the subscriber's CRP record.

Calls are routed based on the most recent update of the CRP record. As described above, whenever an incoming call passes screening by the CRP, the NCP 66 retrieves the location parameter from CRP 68 and passes it to originating access switch 44.

Figure 3:
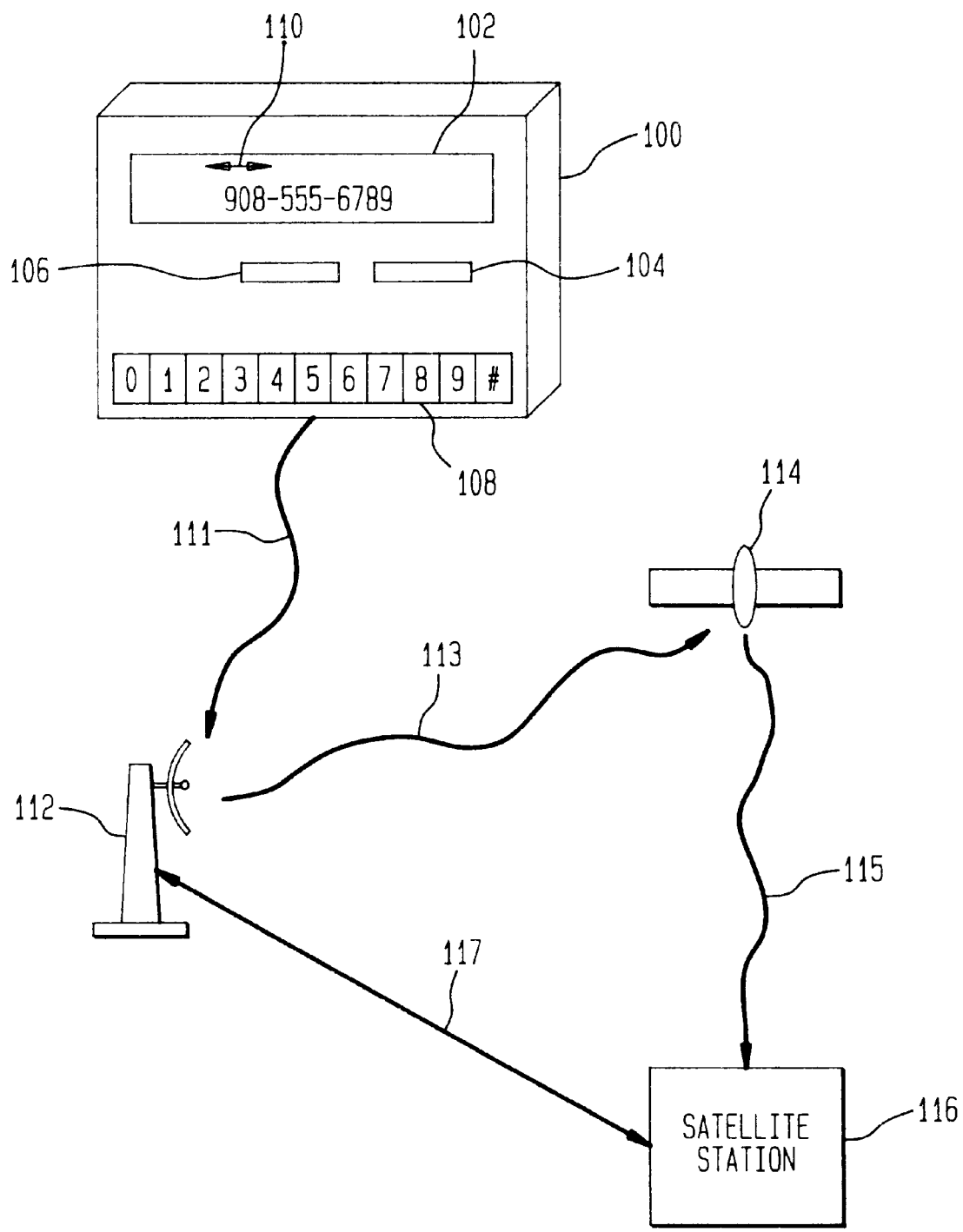
FIG. 3 shows a two-way pager configuration that could be used with the present invention.

FIG. 3 shows an illustrative embodiment of a two-way pager 100, a transceiver 112, a satellite 114, a satellite ground station 116, wireless links 111, 113 and 115, and a communication link 117, the embodiment being suitable for use in accordance with the present invention. The pager 100 includes: a display 102, such as a liquid crystal display or light emitting diode display; a select key 104; a menu key 106; a keypad 108; and a mode indicator 110, that may be included within the display 102.

The pager can include processing hardware and software that automatically sends a signal back to the paging service that updates the database. Additionally, the paging service can send a signal that seeks nationwide the subscriber having the two-way pager. The network can send a signal seeking the two-way pager only periodically, or only when a caller calls seeking the subscriber location.

Figure 4:
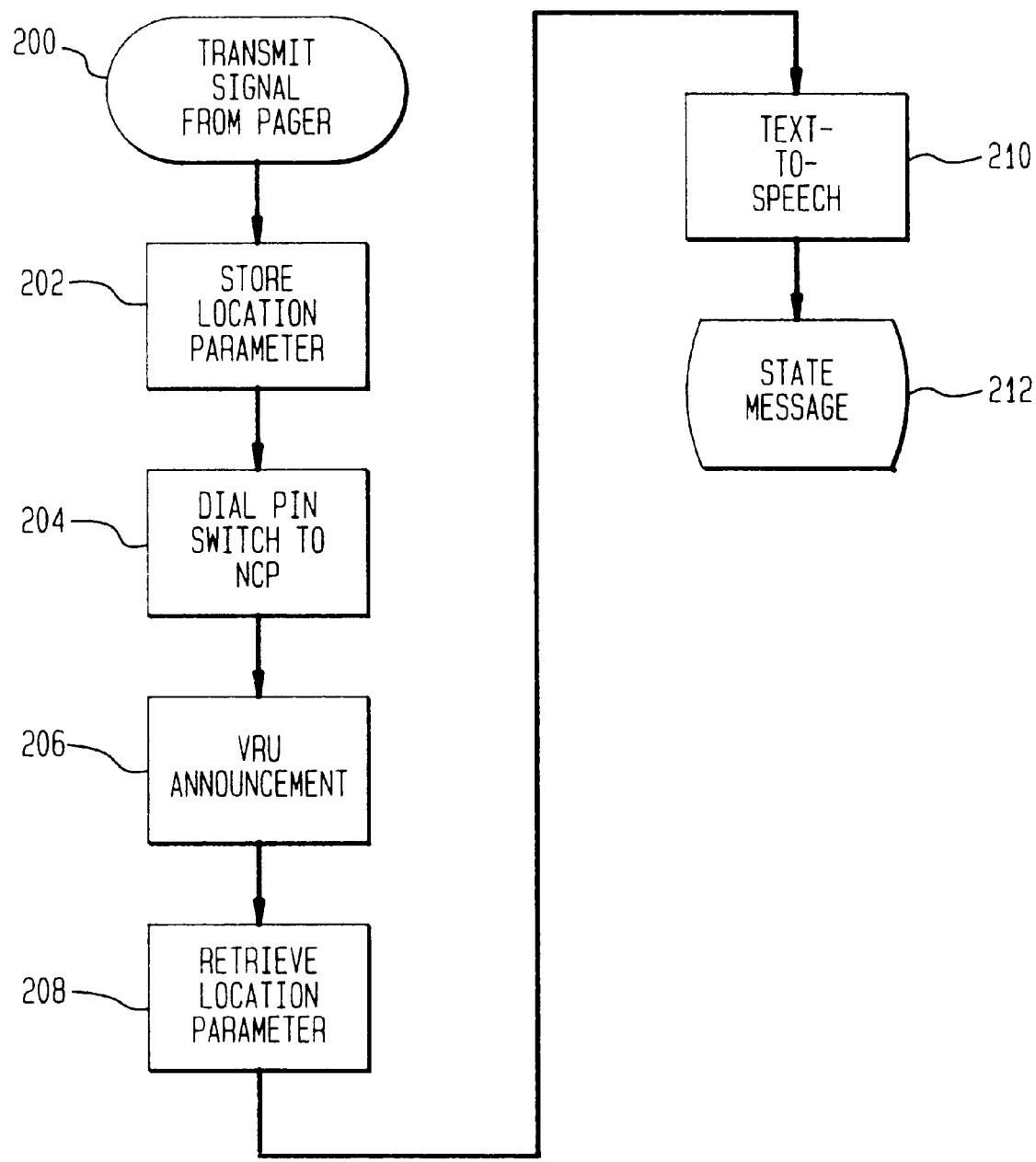
FIG. 4 is a flow chart depicting one method of the present invention.

A high level flow chart is shown in FIG. 4 and is described below. For purposes of description, the flow chart is described with reference numerals beginning in the 200 series of numbers.

In accordance with the invention, a signal is first transmitted from a two-way pager that carried by a subscriber to a paging service of a telephone network (Block 200). A location parameter based on the signal is then stored within a database (Block 202). A caller then dials the personal identification number of the subscriber and the network switch connects him to a network control point (Block 204). A Voice Response Unit can request the caller to state their name or enter a PIN through a series of Dual Tone Multi Frequency signals (Block 206). If the correct name is spoken or the proper PIN number entered, the database is queried to retrieve the location parameter (Block 208) which is then forwarded to the caller through a text-to-speech conversion such as a cell cite number or a city location (Block 210). If the caller had recently queried the location and there has been no change, then the network can respond with an appropriate response such as "there has been no change since your last query (Block 212)."

While the best mode for carrying out the invention has been described in detail, those familiar with the art to which the invention relates will recognize various alternative designs and embodiments for practicing the invention as defined by the following claims.

That which is claimed is:

1. A method for determining the locationn of a subscriber of a two-way paging service comprising the steps:

requesting a personal identification number of a caller to determine if the caller has clearance to receive location information before supplying a sudscriber location message to the caller;

tramsmitting a signal having a location parameter from a two-way pager carried by the subscriber to a database in a paging service of a telephone network, the location parameter originated by the subscriber;

forwarding the location parameter to a networt switch; and supplying a location message to a caller when the caller queries the network for the subscriber location, provided the caller has clearance to receive the location information.

2. A method according to claim 1 including supplying an announcement to the caller indicating the location of the subscriber.

3. A method according to claim 1 including supplying an announcement requesting the caller to state their name, and querying a database to determine if the caller has clearance to receive location information.

4. A method according to claim 1 including the step of using a network control point to route the call to the caller.

5. A method according to claim 1 including step of connecting the call to a voice response unit;
  using the voice response unit to collect one or more entered digits;
  passing the entered digits to a network control point;
  using the entered digits to determine whether the call is to be continued;
  and after determining whether the call is to be continued, switching the call to receive a location parameter.

6. A system for determining the location of a subscriber of a two-way paging service comprising:
  a telephone network including a voice response and database unit, a switched network and a paging service operatively connected thereto, said voice response requesting a caller personal identification number of a caller to determine if the caller has clearance to receive location information before supplying a subscriber location message to the caller; said paging service including a paging receiver for receiving a location parameter from a two-way pager of the subscriber to the paging network, the location parameter originated by the subscriber; and
  said switched network including means for generating a location message to a caller when the caller queries the network for the subscriber location, provided the caller has clearance to receive the location information.

7. A system according to claim 6 including voice response unit for supplying an announcement to a caller requesting a personal identification number from the caller.

8. A system according to claim 6 including a voice response unit for supplying an announcement requesting the caller to state their name.

9. A system according to claim 6 including a database containing a list of names which are compared with the caller name to determine if the caller has clearance to receive location information.

10. A system according to claim 6 wherein said paging service comprises a transceiver for receiving said location parameter.

11. A system according to claim 6 wherein said paging service further comprises a satellite station for receiving said parameters from said transceiver.

12. A system for determining the location of a subscriber of a two-way paging service comprising:
  a database for receiving a location parameter originating from a two-way pager associated with a telephone number of the subscriber, the location parameter being originated by the subscriber;
  a network control point for use in routing the location parameter to a caller requesting the location of the subscriber having the two-way pager; and
  means for requesting a personal identification number of a caller to determine if the caller has clearance to receive location information before supplying a subscriber location message to the caller.

13. A system according to claim 12 including a voice response unit for supplying one or more announcements of the caller.

14. A system according to claim 12 including a paging network, and wherein said location parameter originates from said two-way pager after said paging network sends a signal seeking the location of the two-way pager.

15. A system according to claim 12 wherein said paging network sends a signal seeking the location of the two-way pager only after a caller requests a location of the subscriber.

16. A method for determining the location of a subscriber of a two-way paging service comprising the steps:
  a) transmitting a call from a caller to a network switch to determine the location of a subscriber;
  b) supplying an announcement requesting a personal identification number of a caller to determine if the caller has clearance to receive location information before supplying a subscriber location message to the caller, and querying a database to determine if the caller has clearance to receive the location information;
  c) transmitting a signal to the subscriber on a paging service of a telephone network for location information if the caller has clearance to receive the information;
  d) transmitting a signal having a location parameter from a two-way pager carried by the subscriber to the paging service;
  e) forwarding the location parameter to a network switch; and
  f) supplying a location message to the caller when the caller queries the network for the subscriber location, provided the caller has clearance to receive the location information.

17. A system for determining the location of a subscriber of a two-way paging service comprising:
  a) a telephone network including a switched network and a paging service operatively connected thereto;
  b) said switched network including a voice response unit for supplying an announcement to a caller requesting a personal identification number of a caller to determine if the caller has clearance to receive location information before supplying a subscriber location message to the caller;
  c) said paging service including a paging receiver for receiving a location parameter from a two-way pager of the subscriber to the paging network; and
  d) said switched network including means for generating a location message to the caller if the proper personal identification number is supplied to the voice response unit.

18. A system for determining the location of a subscriber of a two-way paging service comprising:
  a) a database for receiving a location parameter originating from a two-way pager associated with a telephone number of the subscriber;
  b) a voice response unit for supplying one or more announcements to a caller requesting location information of the subscriber; said announcement including a query requesting the caller to enter a personal identification number to determine if the caller has clearance to receive location information before supplying a subscriber location information to the caller; and
  c) a network control point for use in routing the location parameter to the caller requesting the location of the subscriber having the two-way pager provided the caller has clearance to receive the location information.

* * * * *